Feb. 6, 1962 D. E. O'REILLY 3,020,469
BOREHOLE LOGGING METHOD AND APPARATUS
Filed Dec. 17, 1958
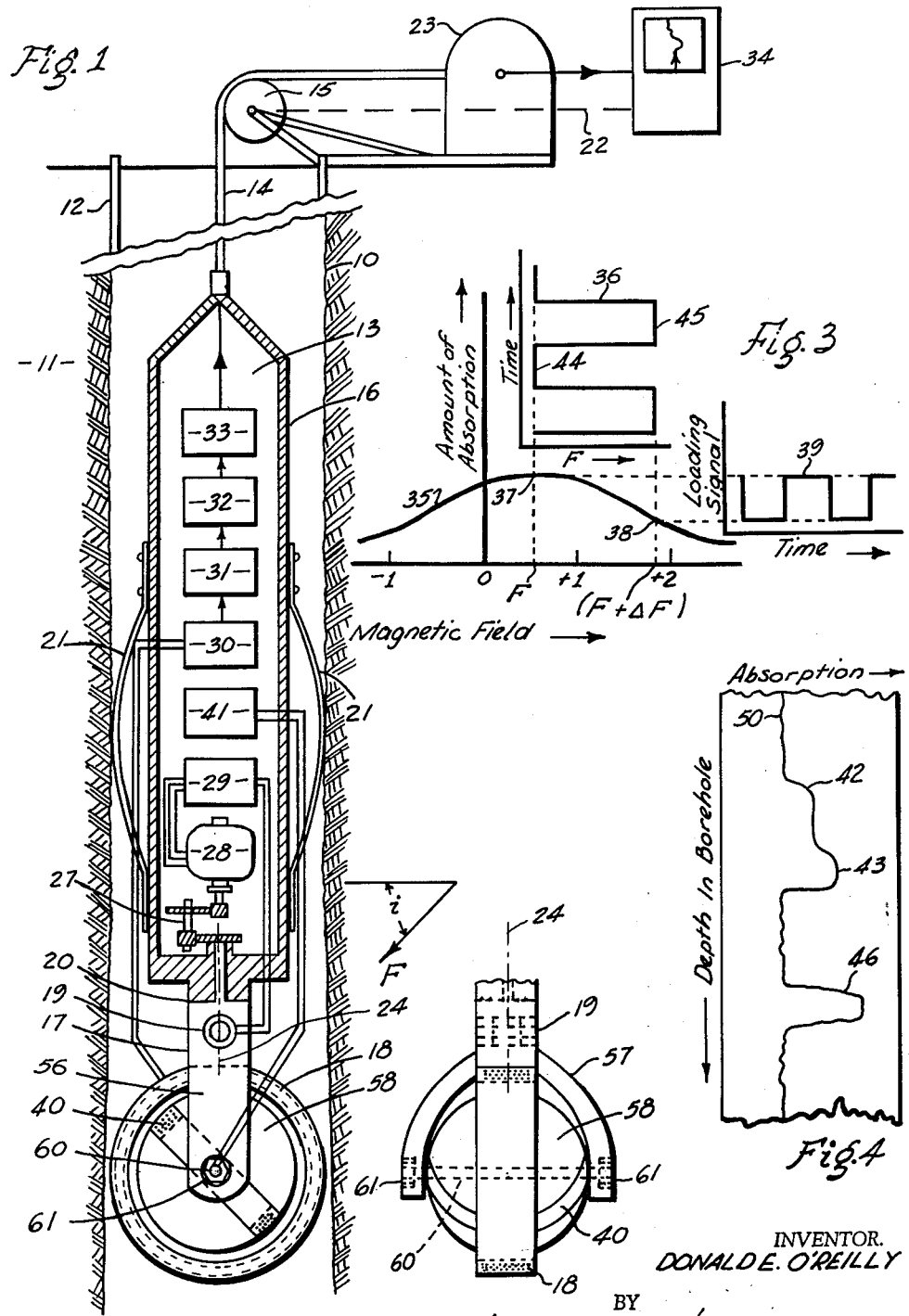
INVENTOR.
DONALD E. O'REILLY
BY
ATTORNEY

United States Patent Office 3,020,469
Patented Feb. 6, 1962

3,020,469
BOREHOLE LOGGING METHOD AND
APPARATUS
Donald E. O'Reilly, Oakmont, Pa., assignor to Gulf Research & Development Company, Pittsburgh, Pa., a corporation of Delaware
Filed Dec. 17, 1958, Ser. No. 781,161
4 Claims. (Cl. 324—.5)

This invention relates to a method and apparatus for logging boreholes and in particular pertains to a method and apparataus for locating the presence of crude oil in a borehole or in the formations penetrated by the borehole. In this invention the crude oil is detected and identified by its electron paramagnetic resonance absorption effect.

In the drilling of boreholes it is common practice to make logs of the hole (generally before it is cased) in order to obtain information regarding the formations which are penetrated by the borehole. Logging methods such as electric, electromagnetic, radioactivity, acoustic, and others are well known in the art. In substantially all of the prior-art logging methods which measure various parameters of the borehole wall, it is difficult if not impossible, to detect the presence of crude oil directly. An approach to this problem has been offered by geochemical logging methods and by radioactivity logging methods, but these methods are indirect and complex and leave much to be desired in reliability and sensitivity. This invention provides a method and apparatus for detecting crude oil directly, which method is undisturbed in its indications by other minerals and fluids normally found in the rocks or in the borehole.

This invention provides a method and apparatus for detecting the presence of crude oil in a borehole or in the wall thereof. The invention further provides a method and apparatus for logging a borehole for crude oil, the presence of which is directly indicated on the log. In another embodiment the invention provides a method and apparatus for determining directly, easily, and quickly the presence of crude oil in a rock sample.

It has been suggested in the prior art to log a borehole using as the logged parameter the nuclear magnetic relaxation times of nuclei of chemical elements in the borehole wall. This method of logging depends for discrimination of elements on a detailed analysis of the nuclear magnetic resonance absorption band for nuclei present since most nuclei present in petroleum are also present in the rocks, brine, etc. albeit in different chemical combinations. Furthermore the technique necessary to elicit the nuclear magnetic resonance phenomenon require an intense magnetic field to be produced by a magnet and this is not well suited for operation inside the limited confines of a borehole. An example of this type of borehole logging is disclosed in British Patent 745,873.

I have discovered that crude oil elicits an electron paramagnetic resonance absorption phenomenon which is believed to be due to the presence of a substantial concentration of unpaired electrons in the heavier fractions of the crude such as the bituminous and/or asphaltic material usually found in crude oils. The phenomenon is less prominent and may be absent from so-called condensate crudes which are free of heavy fractions. By the term crude oil as herein used is meant naturally occurring petroleum of the relatively viscous low-gravity type which upon distillation leaves substantial residue or tar. Many so-called heavy low-gravity crude oils have been tested and show the phenomenon. Laboratory investigation has indicated that there are from $10^{16}$ to $10^{19}$ unpaired electrons present per gram of ordinary crude oil. This invention employs the phenomenon of electron paramagnetic resonance absorption of the crude oil for its direct detection in well logging.

The invention will be described with reference to the accompanying drawings which form a part of this specification and in which:

FIGURE 1 illustrates in diagrammatic form the essential elements of the apparatus inserted in a borehole;

FIGURE 2 shows a side view of the oriented coil portion of the apparatus;

FIGURE 3 is a graph illustrating how the paramagnetic resonance absorption curve gives rise to the output signal employed in this invention; and FIGURE 4 shows a typical log as obtained by this invention.

The phenomenon of the electron paramagnetic resonance occurs when a material having unpaired electrons and located in a magnetic field is subjected to an alternating magnetic field which makes an angle to the fixed field. The phenomenon was predicted by Gorter and Kronig as early as 1936 and has been demonstrated by Purcell and by Bloch to occur in various conditions of matter. For example, Gorter and Kronig predicted that paramagnetic ions in a crystal subjected to a constant magnetic field are capable of absorbing energy from a superimposed high frequency alternating magnetic field which makes an angle to the fixed field, and they further predicted that absorption of the alternating magnetic field would occur at a resonance frequency. The phenomenon may be demonstrated by placing a sample of material in a uniform magnetic field and subjecting it to a high frequency magnetic field (e.g. radio frequency) at right angles to the fixed field, the frequency of the alternating field being gradually varied so that it passes through the region of paramagnetic resonance absorption. By means of conventional alternating-current measuring devices the loading of the coil which generates the alternating magnetic field may be measured and indicated, and when plotted as a function of frequency the loss curve shows a typical resonance absorption curve at the frequency of the paramagnetic resonance absorption. The sharpness of the resonance effect is enhanced by employing a highly uniform fixed field, and is most pronounced when the alternating field and the fixed field are at right angles to each other.

I have discovered that crude oil shows a sharply-peaked paramagnetic resonance absorption effect which theoretical computations indicate are due to unpaired electrons in the crude oil. I have further observed that the materials which ordinarily accompany crude oil in the ground do not show a similar sharply peaked effect in the same frequency range. By employing this invention one can distinguish and identify crude oil in situ in the ground or in a sample of rock by means of its electron paramagnetic resonace absorption effect.

Referring to FIGURE 1 there is illustrated a borehole 10 penetrating earth formations 11, the borehole ordinarily being filled with drilling fluid (not shown) as is customary in the drilling of boreholes. The borehole may have casing 12 in its upper regions, but since the rock formations to be logged must be subjected to the magnetic field of the apparatus the invention cannot be used in cased holes and is applicable only in uncased parts of the borehole, i.e. below the lower end of the casing 12. The apparatus comprises a sonde 13 which is lowered into the well by means of a conductor cable 14 which passes over a sheave 15 to hoisting mechanism 23 as is conventional in borehole logging operations. The sonde 13 comprises two parts namely an upper sealed housing 16 which houses control apparatus, oscillator, square-wave generator, power converters, etc. to be described later and which are required for the measurements to be made, and a lower unit 17 which is rotatable about a longitudinal axis 24 with respect to the upper housing 16. The lower housing 17 is made of non-magnetic material that is preferably also electrically non-conducting (e.g. plastic). The lower unit 17 contains a first coil 18 whose winding axis is perpendicular to the longitudinal rotation axis 24 of the unit 17, a second coil 40 whose magnetic field spatially overlaps that of the first coil and which is adjustably mounted on a diametral axis parallel to the winding axis of first coil 18 so that the orientation of the winding axis of coil 40 may be adjusted in a plane perpendicular to the winding axis of first coil 18 as will be described later, and a magnetic detector 19 fixed with respect to coil 18 so that the principal magnetic axis of detector 19 is parallel to the winding axis of coil 18. A pressure seal (not shown in detail) is provided at the junction 20 between the upper housing 16 and the lower unit 17 of the sonde. The lower unit 17 with coils 18 and 40 and detector 19, may be rotated about the longitudinal axis 24 into any desired azimuth by means to be described. Bowed springs 21 mounted on the outside of upper housing 16 of the sonde provide a substantial amount of friction against the borehole wall to retard rotation of the upper housing 16 of the sonde in the borehole but permit the sonde to be moved up and down in the borehole by means of conductor cable 14.

The fixed magnetic field employed by this invention is that of the earth and is indicated in FIGURE 1 by the arrow F. The earth's magnetic field vector F has a direction which is vertical at the north and south magnetic poles, but which away from the poles will cut a substantially vertical borehole at an angle indicated by the dip angle "i" indicated in FIGURE 1 as is well known. The earth's magnetic field is furthermore substantially uniform over the region around the borehole which is a desirable feature for the purposes of this invention. In order for the paramagnetic resonance absorption effect to have maximum amplitude it is desirable that the coil 18 be oriented so that the field of coil 18 will be perpendicular to the earth's magnetic field vector F over a substantial region, and this is accomplished by automatically orienting the winding axis of coil 18 so that it is perpendicular to the earth's magnetic field vector F at the borehole location.

The upper housing 16 of sonde 13 has an external diameter less than the minimum diameter of the borehole so that borehole fluid may pass the sonde 13 as it is lowered into the borehole. It is desirable for the coil 18 to be as large as practicable and accordingly it may be made somewhat larger in diameter than the upper housing 16 of the sonde but of a diameter that will fit into the borehole. The coil form of coil 18 is annular in shape and is rigidly mounted on the rotatable lower unit 17 in an orientation so that the winding axis of coil 18 is perpendicular to the axis of rotation 24 of the lower unit 17. In FIGURE 1 the winding axis of coil 18 is perpendicular to the plane of FIGURE 1. The windings of coil 18 are preferably impregnated and covered with an abrasion-resistant plastic covering so as to protect the windings. The coil form of coil 18 is made of electrically-insulating non-magnetic material (e.g. plastic) and is wound with insulated electrically conducting non-magnetic wire (e.g. copper) as is customary in making electrical coils.

The stem of lower unit 17 has a bifurcated downward extension whose two legs 56 and 57 (best seen in FIGURE 2) of non-conducting non-magnetic material extend downward to support an inner coil form 58 on which a second coil 40 of insulated electrically conducting non-magnetic wire (e.g. copper) is wound. The inner coil form 58 is preferably in the shape of a sphere of electrically-insulating non-magnetic material (e.g. plastic) with a great-circle groove in which the coil 40 is wound, the windings being covered with plastic for protection. The coil form 58 is drilled along a diameter passing through the circular groove. The coil form 58 is held between the legs 56 and 57 by means of a non-magnetic non-conducting rod 60 closely fitting the hole in coil form 58. Rod 60 is mounted between the legs 56 and 57 perpendicular to the axis of rotation of the lower unit 17 and parallel to the winding axis of coil 18. The ends of the rod 60 are threaded to receive clamping nuts 61, the nuts being non-magnetic non-conducting material such as plastic. Counterbores are provided in the legs 56 and 57 so that the nuts 61 do not protrude. The dimensions of the parts are such that the maximum distance across the outside of legs 56 and 57 is substantially the same as the outside (maximum) diameter of first coil 18 so that the unit 17 may be inserted into the borehole. Inasmuch as the coil form 58 is smaller in diameter than coil 18, there is ample space between the legs 56 and 57 and the coil form 58 for borehole fluid to by-pass the unit 17 as the sonde is raised and lowered in the borehole. By tightening the nuts 61 the coil 40 is clamped in any desired orientation on its horizontal axis of adjustment, but the entire lower unit 17 is rotatable about a vertical axis. In the lower unit 17 the axis of adjustment of the second coil 40 is parallel to and may coincide with the winding axis of coil 18. As will be explained in more detail later, coil 40 is clamped by nuts 61 in an orientation so that the winding axis of coil 40 is parallel to the earth's magnetic field vector F when the winding axis of coil 18 is perpendicular to the earth's magnetic field vector F in a vertical borehole.

Spaced some distance above the coil 18 and rigidly mounted in the lower unit 17 is a polarized magnetic detector 19 preferably of the flux-gate type. The magnetic detector 19 is mounted in an orientation in unit 17 so that the principal magnetic axis of detector 19 is parallel to the winding axis of the coil 18, and thereby also parallel to the adjustment axis of coil 40. The lower unit 17 of the sonde containing coils 18 and 40 and detector 19 is oriented in azimuth in the borehole, and to this end the unit 17 is connected to the upper housing 16 through a gear train 27 driven by an orienting servomotor 28. The servomotor 28 is controlled from the detector 19 by conventional means so as to maintain the detector 19 in an orientation of minimum earth's magnetic field component along its principal magnetic axis. A conventional flux-valve orienting system 29 is connected to the magnetic detector 19 and to the servomotor 28 and is contained in the upper housing 16 of the sonde. Orienting systems of this type are well known, one such being shown for example in U.S. Patents 2,406,870 and 2,555,209. The orienting system should not only maintain the principal axis of the magnetic detector 19 in minimum field, but should be polarized to be directionally sensitive so as to maintain the winding axis of coil 18 substantially at right angles to the earth's magnetic field vector F in the same sense. Because of the friction of spring 21 on the borehole wall the sonde 13 cannot rotate very fast so that a servo system of reasonably good response will not lose the correct sense. The orienting system thus serves to maintain the winding axis of coil 18 at right angles to the earth's magnetic field vector F, and at the same time also maintains the adjustment axis of coil 40 at right angles to the earth's magnetic field vector F.

The windings of coil 18 are connected to a radio-frequency oscillator 30 and loss-measuring apparatus of conventional form. The oscillator 30 comprises a variable-frequency oscillator whose frequency may be adjusted in the range 800 to 1700 kilocycles per second. The electron paramagnetic resonance absorption effect of crude oil will occur in a sample exposed to the earth's field if the alternating magnetic field has a frequency somewhere in this range. The oscillator 30 is provided with conventional means for adjusting its frequency as for example by means of a variable condenser in its tank circuit. The frequency of oscillator 30 is adjusted to a value which is substantially at the peak of the electron paramagnetic resonance absorption curve for crude oil when in the particular earth's magnetic field strength at the borehole. The oscillator 30 is a conventional regenerative oscillator and the output current of the oscillator 30 is passed through coil 18 to set up an R.-F. alternating magnetic field which by action of the automatic orienting means is maintained at right angles to the stationary magnetic field vector F over a substantial region of the borehole wall. The diameter of coil 18 is sufficiently large so that there is set up an R.-F. magnetic field in a substantial region of the borehole wall, preferably for a distance of one or more borehole diameters from the axis of the borehole. The output of the oscillator 30 is monitored by a conventional detector circuit 31 connected thereto. The output of the detector circuit 31 is fed to an audio amplifier 32, and then to a rectifier 33 whose output is transmitted over cable 14 to the surface of the earth and recorded on a conventional strip chart recorder 34. The chart of recorder 34 is driven in proportion to the length of cable 14 payed out over the sheave 15 by means of a mechanical or selsyn connection 22 as is conventional in borehole-logging operations. In addition to the conductors that transmit the signal from the sonde to the recorder 34, the cable 14 will contain one or more conductors to supply appropriate power to the motors and the electronic parts of the sonde as is conventional in borehole logging apparatus.

The field-modulating coil 40 is connected to a square-wave generator 41 which supplies rectangular unidirectional current pulses to the coil 40, the time interval between pulses being about the same as the time duration of the current pulse. The frequency of the pulses is in the low audio range and may for example be 100 cycles per second. The purpose of the unidirectional current pulse in coil 40 is to set up a field which changes the ambient magnetic field to which the material around the coils 18 and 40 is subjected to such an extent that the frequency of oscillator 30 is no longer at the peak of the resonance curve for crude oil when in the combined field of the earth and that of coil 40. The unidirectional current pulses in coil 40 may be in either direction, but preferably the direction is such that when the lower part 17 of the sonde is automatically oriented, the current pulse in coil 40 will produce a field that adds to the earth's magnetic field vector F by a substantial amount which may be termed $\Delta F$. This will cause the magnetic field in a substantial part of the borehole wall to be alternately F and $[F+\Delta F]$, the magnetic field being at these two values during substantially equal alternate intervals of time, and switching rapidly from one to the other. The rectangular unidirectional pulses are preferably obtained by means of a D.C. supply and a conventional motor-driven rotary on-off switch, but any known electronic square-wave generator with power amplifier may alternatively be employed. The current pulses in coil 40 should be of a magnitude to produce a substantial change, for example a change of one to three gauss, in the field at a distance of one or more borehole diameters from the axis of the borehole. The manner in which the field modulation effected by the current in coil 40 gives rise to the output signal will be explained more fully later.

In FIGURE 1 the coils 18 and 40 are shown connected respectively to oscillator 30 and square-wave generator 41 by wires external to the sonde but this is merely to simplify the illustration, as the connections will be sealed into rigid portions of the sonde and carried by slip ring connections or flexible pig tail connections at movable joints as is conventional.

The chart of recorder 34 will indicate the degree of change in loading of coil 18 caused by the modulating field $\Delta F$ previously mentioned, as a function of depth in the borehole. All of the various losses of coil 18 will remain independent of changes in this field except those introduced by the electron paramagnetic resonance absorption effect of any crude oil present. The electron paramagnetic absorption effect will be maximum at a particular R.-F. oscillator frequency and value of the earth's field, and the absorption effect will fall off for values of magnetic field on either side of this maximum. However, losses which are substantially independent of the ambient field will remain constant. Accordingly the square-wave changes in the field produced by the modulation effect of coil 40 will produce a square-wave change in the losses of coil 18 only if material is present which has an electron paramagnetic resonance absorption effect at the frequency employed and which is substantially different at the two fields F and $(F+\Delta F)$ employed. The resulting square-wave change in loading is detected by demodulator 31, and the demodulated signal is amplified by amplifier 32, rectified by rectifier 33, and appears as a D.-C. output on recorder 34. It is to be noted that this D.-C. output does not represent the total losses in coil 18, but represents only the change in losses produced by the modulation of the magnetic field, and this change takes place only when the electron paramagnetic resonance absorption present is materially different at the two magnetic field values F and $(F+\Delta F)$ as will become evident later in connection with the discussion of FIGURE 3. Accordingly recorder 34 will read zero except when a material is present having electron paramagnetic resonance absorption properties at the particular field strength and frequency employed.

Prior to running a log with the apparatus of this invention the angle of dip "$i$" of the earth's field F at the location is first determined. The dip angle "$i$" is known to be substantially constant from top to bottom of an ordinary borehole. The dip angle may be ascertained from well known magnetic charts where such are available, or alternatively the dip angle may be measured by means of conventional magnetometric apparatus in any one of several conventional ways which will not be described here since they form no part of this invention and are well known. The angular orientation of coil 40 in the lower unit 17 of the sonde is then adjusted so that the winding axis of coil 40 makes the same angle to the horizontal as the dip angle "$i$." This is done by adjusting and clamping the coil form 58 so that the winding axis of coil 40 makes an angle with the longitudinal rotation axis 24 of unit 17 that is the complement of the dip angle "$i$," whereby the winding axis of coil 40 will be maintained parallel to the earth's magnetic field vector F at the location when the unit 17 is automatically oriented. The adjustment of coil 40 is easily made with the aid of a protractor, or for convenience a calibrated angular scale (not shown) may be permanently attached to the coil form 58 and an index mark (not shown) scribed on one of the legs 56 or 57. In setting the coil 40 at the correct angle care must be taken that the coil 18 is in the same sense of orientation as that automatically maintained by the orienting system, so that when the apparatus is in a vertical borehole and the lower unit 17 is automatically oriented, the winding axis of coil 18 is perpendicular to the earth's magnetic field vector F and the winding axis of coil 40 is at the same time parallel to the earth's magnetic field vector F.

Also prior to running the log the oscillator 30 is adjusted to the proper frequency so that the frequency of the R.F. field of coil 18 is that which elicits the maximum electron paramagnetic resonance absorption effect for the particular intensity of the earth's field at the location of the borehole to be logged. The intensity of the earth's field at the borehole may be ascertained from magnetic charts where such are available or alternatively the intensity may be measured at the surface of the ground by means of a conventional total field magnetometer. Apparatus for such measurement is well known and does not form part of this invention and hence will not be described here. It is known that the magnitude of the earth's magnetic field vector F varies but very little over the depth of an ordinary borehole. The relation between the oscillator frequency $v$ (in cycles per second) and the magnetic field strength $F$ (in gauss) is given by the equation $2\pi v = \gamma F$ (where $\gamma$ is called the gyromagnetic ratio). For the electron paramagnetic resonance effect of crude oil this is simply $f=2799F$ where $F$ is measured in gauss and $f$ is in kilocycles per second. The following table gives values of the frequency of oscillator 30 to be used where the magnetic field has typical values as indicated:

| F, gauss: | f, kilocycles per second |
|---|---|
| 0.3 | 839.7 |
| 0.4 | 1120 |
| 0.5 | 1400 |
| 0.6 | 1679 |

Referring now to FIGURE 3, a graph of the variation of the intensity of electron paramagnetic resonance absorption with the strength of the steady field for a particular value of R.-F. frequency is given by curve 35. For purposes of illustration the R.-F. frequency is taken as 1400 kilocycles per second. At a particular value of steady field ($F=0.5$) the absorption is a maximum, and the absorption falls off on both sides of the maximum as indicated by curve 35. The curve 35 of FIGURE 3 has its peak at $F=0.5$ and it will be assumed for purposes of illustration that the field is that of the earth and has the value 0.5 gauss. The curve 36 drawn above the curve 35 illustrates the time variation of the magnetic field upon being modulated by the current in coil 40. The modulation effect causes the field to jump between 0.5 and $(0.5+\Delta F)$, the particular $\Delta F$ shown for purposes of illustration being about $+1.25$ gauss. By projecting the values from curve 36 downward to the curve 35 it is seen that the absorption differs at these two field values as shown by the difference between ordinates 37 and 38. To the right of the curve 35 is plotted as a function of time the resulting variation in absorption, i.e. loading, of the coil 18 due to the change in electron paramagnetic resonance absorption and it is apparent that this curve 39 is a square-wave variation having the modulation frequency. This modulation signal is extracted from the R.-F. by the detector 31, amplified by amplifier 32, and rectified by rectifier 33, so that it appears in the output as a D.-C. signal recorded on recording 34. It is further apparent that since the frequency of oscillator 30 is not changed during the modulation of the field, losses other than electron paramagnetic resonance absorption that may be present in the materials surrounding the lower unit 17 of the sonde will not change, and therefore the output signal is a measure only of the amount of electron paramagnetic resonance material present in the space influenced by the fields of coils 18 and 40.

The illustration of FIGURE 3 is an example of how the principle of this invention is applied in a borehole where the earth's magnetic field strength is one of the extreme values 44 or 45 between which the field represented by curve 36 varies. It is apparent that the essential element is that the field represented by one of the extreme values reached by curve 36 must produce more electron paramagnetic resonance absorption than the field represented by the other extreme value reached by curve 36. It is further apparent that either one of the extreme values 44 or 45 may be the one corresponding to the peak of the resonance curve 35, i.e. the field of either extreme 44 or 45 may be the one that is related to the frequency of oscillator 30 by the relation $f=2799F$, and the other extreme differs therefrom by an amount which elicits a different amount of electron paramagnetic absorption. The difference between the two extremes 44 and 45 should be sufficiently large to give an observable signal, but should not go beyond the point on curve 35 where the slope is substantially changing. This difference should for purposes of this invention not exceed six gauss, and is preferably from one to three gauss.

FIGURE 4 shows an example of the type of log (curve 50) which can be expected. In the absence of the crude oil in either the borehole or the borehole wall, the curve 50 will show substantially a zero indication with increasing depth (downward on FIGURE 4). When the coils 18 and 40 reach a depth in the borehole where the electron paramagnetic resonance absorption effect of crude oil is encountered the curve 50 will show an increase (toward the right in FIGURE 4) as indicated at 42, 43, and 46. The deflection of curve 50 depends on the amount of crude oil in the formation and therefore depends also on the porosity and degree of oil saturation. For example, the indication 42 in FIGURE 4 may be due to a low saturation of oil. This may be due to a tight formation having little pore space, or due to a large degree of water saturation with only little oil present. A high absorption indication such as shown at 43 and 46 indicates a high saturation of crude oil in the formation at that depth. The curve 50 will return to substantially its zero value after the oil-bearing horizon has been passed. In this manner the depth of the oil-bearing formations may be ascertained directly, because the electron paramagnetic resonance absorption phenomenon is attributable directly to the presence of crude oil in the formation that is under the influence of the fields of coils 18 and 40.

Certain clays and other minerals show a paramagnetic resonance absorption due to the presence of iron in the form $Fe^{+3}$. However, the ion $Fe^{+3}$ which occurs in clays and other rocks shows a very broad paramagnetic resonance and while it is in about the same region as that observed for crude oil, the resonance due to $Fe^{+3}$ is very broad (i.e. of the order of 50 gauss). Because of the very broad resonance curve of $Fe^{+3}$, its absorption is substantially constant over the much sharper (i.e. relatively-narrow) absorption band of the crude oil. Consequently the modulation field of coil 40 being only of one to three gauss in magnitude causes substantially no change in the loading of coil 18 due to the presence of $Fe^{+3}$ and accordingly $Fe^{+3}$ does not produce an output signal in the apparatus. The resonance frequencies of absorption for all other materials commonly found associated with petroleum are outside the frequency range (800 to 1700 kilocycles per second) in which the electron paramagnetic resonance absorption occurs for crude oil in the earth's magnetic field. Furthermore, water and brines show no paramagnetic resonance absorption effect. Ordinarily aqueous drilling muds have no appreciable paramagnetic resonance absorption effect except for the $Fe^{+3}$ discussed above which may be present in clay or other materials in the mud. The method of this invention is therefore not disturbed in its efficacy in detecting and identifying crude oil by other materials normally present in a borehole or in the wall of the borehole.

It is apparent that when logging a borehole by means of this invention any electrically conducting fluids such as brine or drilling mud present in the borehole will by their eddy-current effect tend to load the circuits of coils 18 and 40. As previously mentioned this loading will not be indicated by the meter 34. However this loading represents losses that must be supplied by the sources 30 and 41 and it is advantageous to keep such useless losses to a minimum. Accordingly in FIGURES 1 and 2 the coil form 58 is made in the form of a solid sphere of plastic which displaces borehole fluid to a considerable extent and prevents any conductivity in the fluid from unnecessarily loading the circuits. Further improvement in this regard may be made by enclosing the entire lower unit 17 in a thin non-magnetic electrically non-conducting capsule (not shown) whose outside diameter is but slightly less than the diameter of the borehole, and filling the capsule with a liquid that has no electron paramagnetic resonance absorption effect, as for example pure water, liquid silicones, or medicinal mineral oil. Equalization of fluid pressure between the interior and exterior of the capsule can be maintained by means of a bellows or other similar well-known pressure transfer device in well known manner. The capsule is made thin so as not to occupy much space between the coils (which as indicated previously are preferably made as large as practicable) and the borehole wall, a slight clearance being provided between the coils and the inside of the capsule so that the unit 17 may be rotated inside the capsule without rotating the latter. In such an arrangement the capsule may also include the servomotor 28, thus eliminating from the apparatus the need for the sealed rotating joint 20.

It is apparent however that the invention cannot be used in boreholes containing oil-base drilling fluids unless such drilling fluids are prepared from highly refined oils from which the heavier fractions have been removed. Alternatively the oil-base drilling fluid may be flushed out or displaced from the portion of the borehole to be investigated. It is relatively simple to determine whether any particular mud disturbs the indication by merely immersing the lower unit 17 of the sonde in the mud of the mud pit prior to running the log and observing the indication on recorder 34. On the other hand the invention may be usefully employed to locate porous zones in bore holes that were drilled with heavy crude-oil-base drilling fluids. The porous zones will contain crude oil filtrate from such a drilling fluid and the log made with this invention in such a bore hole from which the oil-base drilling fluid has been displaced will indicate porous zones by relatively higher values of absorption due to the crude oil filtrate remaining in the porous formations.

The method and apparatus of this invention may also be used for ascertaining the water-oil contact of fluid which may be standing in the borehole. For this type of application the coil form 58 of coil 40 is made in the form of an annulus so as to permit the well fluid access to the inside of the coil 40.

The method and apparatus of this invention may also be employed to identify petroleum in core samples in the laboratory. In such embodiment of the invention the automatic orienting system comprising elements 19, 27, 28, and 29 may be omitted, since coils 18 and 40 may easily be manually oriented so that their respective winding axes have the proper orientation with respect to the earth's magnetic field vector in the laboratory. The recorder 34 may also be replaced by a simple D.-C. indicating meter. For testing core samples a hole (not shown) is drilled in the coil form 58 of coil 40 on a diameter substantially parallel to the winding axis of coil 40 so that a core sample may be inserted inside the coil 40 and the measurement made on the core sample. No orientation of the core sample itself is necessary and the sample may be a core or may comprise drill cuttings in a non-magnetic non-conducting container, e.g. a glass bottle, which may be inserted into the hole in the coil form 58. The presence of crude oil in a core sample may very quickly and easily be ascertained with the apparatus of this invention without necessitating time-consuming expedients of heating, leaching with solvents, evacuating, etc., that have heretofore been required to identify crude oil in a core by extraction methods. Furthermore, this invention by employing the earth's magnetic field avoids the necessity of providing a large electromagnet as is required for making conventional nuclear magnetic resonance absorption measurements or for making conventional electron paramagnetic resonance absorption measurements in the laboratory. This invention thus provides an inexpensive and convenient method and apparatus that may be advantageously employed to log a borehole directly for the presence of crude oil in the core samples or drill cuttings taken from various known depths in the borehole.

What I claim as my invention is:

1. Apparatus for logging a bore hole in the earth which comprises a sonde insertable in the borehole, a first coil of insulated wire insertable in the borehole mounted on said sonde, automatic means in said sonde maintaining the winding axis of said first coil in an orientation substantially perpendicular to the earth's magnetic field vector at the borehole, a second coil of insulated wire insertable in the borehole mounted on said sonde, support means associated with said first coil supporting said second coil in an orientation so that the winding axis of said second coil is substantially parallel to the earth's magnetic field vector at the borehole when said first coil is oriented by said automatic orienting means, said first and second coils being disposed to produce overlapping magnetic fields over a substantial region when said coils are energized, a source of radio-frequency current electrically connected to and energizing said first coil at a frequency substantially equal to that given by the relation $f = 2799F$ where $f$ is the frequency in kilocycles per second and F is the strength of the earth's magnetic field in gauss at the borehole, a source of square-wave unidirectional current pulses electrically connected to and energizing said second coil, the magnitude of said current pulses in said second coil producing a field of strength not exceeding six gauss at the region of overlapping fields, and means connected to said first coil measuring and indicating changes in the electrical energy losses thereof.

2. Apparatus for logging a borehole in the earth which comprises a sonde insertable in the borehole and having a longitudinal axis substantially parallel to the axis of the borehole, a first coil of insulated wire insertable in the borehole and rotatably mounted on said sonde in an orientation such that the winding axis of said first coil is perpendicular to the longitudinal axis of said sonde and said first coil being rotatable on an axis substantially parallel with the longitudinal axis of said sonde, a polarized magnetic detector mounted in fixed configuration to said first coil so that the principal magnetic axis of said magnetic detector is parallel to the winding axis of said first coil, a second coil of insulated wire insertable in the borehole and adjustably mounted on said first coil and disposed so that said first and second coils when energized produce overlapping magnetic fields, said second coil being adjustably supported on a diametral axis thereof parallel to the winding axis of said first coil and oriented on said diametral axis so that the angle between the winding axis of said second coil and the longitudinal axis of the sonde is substantially equal to the complement of the angle of dip of the earth's magnetic field vector at the borehole, servo means in said sonde electrically connected to and controlled by said magnetic detector and mechanically turning said first coil and second coil and magnetic detector about said longitudinal axis into an orientation of minimum magnetic field component along the principal axis of said magnetic detector, a radio-frequency oscillator in said sonde electrically connected to and energizing said first coil at a frequency substantially equal to that given by the relation $f = 2799F$ where $f$ is the frequency in kilocycles per second and F is the strength of the earth's magnetic field in gauss at the borehole, a source of square-wave unidirectional current pulses in said sonde electrically connected to and energizing said second coil, the magnitude of said current pulses in said second coil producing a field in the range of one to three gauss at the region of overlapping fields, detecting means in said sonde connected to said first coil responsive to changes in the electrical energy losses of said first coil effected by said current pulses in said second coil, and indicating means connected to said detecting means indicating the output thereof.

3. Apparatus of claim 2 in which the direction of the magnetic field produced by said current pulses in said second coil is in the same directional sense as the earth's magnetic field vector at the region of overlapping fields.

4. Apparatus of claim 2 including means for displacing borehole fluid surrounding said first and second coils when in the borehole by a medium having substantially no electron paramagnetic resonance effect.

References Cited in the file of this patent

UNITED STATES PATENTS

| | | |
|---|---|---|
| 1,141,373 | Schlumberger | Mar. 18, 1957 |
| 2,909,725 | Bell | Oct. 20, 1959 |
| 2,913,658 | Burdine | Nov. 17, 1959 |

FOREIGN PATENTS

| | | |
|---|---|---|
| 745,873 | Great Britain | Mar. 7, 1956 |

OTHER REFERENCES

Brown: Physical Review, vol. 78, No. 5, June 1950, pp. 530 through 532.

Becker: Physical Review, vol. 99, No. 6, September, 1955, pp. 1681 through 1683.

Reif et al.: Physical Review, vol. 91, No. 3, August 1953, pp. 631 through 641.

Ingram et al.: Philosophical Magazine, vol. 45, No. 370 November 1954, pp. 1221 through 1223.

Ingram: Spectroscopy at Radio and Microwave Frequencies, Butterworths Scientific Publications, London, 1955, page 258 principally relied on.

Darrow: Electrical Engineering, vol. 70, No. 5, May 1951, pp. 401 through 404.

Gutowsky et al.: Journal of Chemical Physics, vol. 28, No. 4, April 1958, pp. 744 and 745.

Gabillard: Academie des Sciences, Comptes Rendus, vol. 237, No. 14, October 1953, pp. 705 to 708.